US008515434B1

(12) United States Patent
Narendran et al.

(10) Patent No.: US 8,515,434 B1
(45) Date of Patent: Aug. 20, 2013

(54) METHODS AND DEVICES FOR LIMITING ACCESS TO FEMTOCELL RADIO ACCESS NETWORKS

(75) Inventors: Rajveen Narendran, Olathe, KS (US); Ryan S. Talley, Overland Park, KS (US); Muralidhar Malreddy, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 362 days.

(21) Appl. No.: 12/756,629

(22) Filed: Apr. 8, 2010

(51) Int. Cl.
*H04W 40/00* (2009.01)

(52) U.S. Cl.
USPC .................. 455/446; 455/452.2; 455/435.1; 370/230

(58) Field of Classification Search
None
See application file for complete search history.

(56) References Cited

U.S. PATENT DOCUMENTS

| | | | |
|---|---|---|---|
| 5,649,299 A | 7/1997 | Battin et al. |
| 5,890,067 A | 3/1999 | Chang et al. |
| 5,995,923 A | 11/1999 | Mermelstein et al. |
| 6,014,568 A | 1/2000 | Alperovich et al. |
| 6,021,328 A | 2/2000 | Curtis et al. |
| 6,081,229 A | 6/2000 | Soliman et al. |
| 6,148,207 A | 11/2000 | Baum et al. |
| 6,161,022 A | 12/2000 | Hwang et al. |
| 6,172,974 B1 | 1/2001 | Tseng et al. |
| 6,208,631 B1 | 3/2001 | Kim |
| 6,223,041 B1 | 4/2001 | Egner et al. |
| 6,243,590 B1 | 6/2001 | Reddy et al. |
| 6,272,358 B1 | 8/2001 | Brent et al. |
| 6,418,147 B1 | 7/2002 | Wiedeman |
| 6,480,541 B1 | 11/2002 | Girod et al. |
| 6,501,736 B1 | 12/2002 | Smolik et al. |
| 6,522,888 B1 | 2/2003 | Garceran et al. |
| 6,526,029 B1 | 2/2003 | Zhong |
| 6,577,616 B1 | 6/2003 | Chaudry et al. |
| 6,591,110 B1 | 7/2003 | Kim et al. |
| 6,606,496 B1 | 8/2003 | Salvarani et al. |
| RE38,244 E | 9/2003 | Han et al. |
| 6,625,119 B1 | 9/2003 | Schuster et al. |
| 6,718,183 B1 | 4/2004 | Blust et al. |
| 6,745,012 B1 | 6/2004 | Ton et al. |
| 6,757,520 B2 | 6/2004 | Attar |

(Continued)

FOREIGN PATENT DOCUMENTS

| | | |
|---|---|---|
| WO | WO 2004/004249 | 1/2004 |
| WO | WO 2004/028095 | 4/2004 |

OTHER PUBLICATIONS

U.S. Appl. No. 12/538,624, Final Office Action dated Dec. 19, 2011.

(Continued)

*Primary Examiner* — Rafael Perez-Gutierrez
*Assistant Examiner* — German Viana Di Prisco

(57) ABSTRACT

Femtocell radio access network (RAN) devices are typically small, low-cost base stations that can be deployed in areas where macro-cellular RAN coverage is poor or congested. Thus, wireless communication devices (WCDs) using femtocell devices may benefit from improved wireless coverage, while traffic is offloaded from the macro-cellular RAN. It is desirable to use femtocell devices to their full extent, but also to give the owners of these femtocell devices control over which WCDs may use of femtocell services. Accordingly, femtocell devices may be provisioned with a "greylist" that specifies which WCDs are granted full femtocell services, and which WCDs are granted limited or no femtocell services.

19 Claims, 5 Drawing Sheets

(56) References Cited

U.S. PATENT DOCUMENTS

| | | |
|---|---|---|
| 6,775,252 B1 | 8/2004 | Bayley |
| 6,839,356 B2 | 1/2005 | Barany et al. |
| 6,856,954 B1 | 2/2005 | Su |
| 6,944,454 B1 | 9/2005 | Lee et al. |
| 6,970,437 B2 | 11/2005 | Lott et al. |
| 6,970,871 B1 | 11/2005 | Rayburn |
| 6,975,609 B1 | 12/2005 | Khaleghi et al. |
| 6,980,523 B1 | 12/2005 | Lipford et al. |
| 7,058,124 B2 | 6/2006 | Koo |
| 7,099,283 B2 | 8/2006 | Matta et al. |
| 7,120,447 B1 | 10/2006 | Chheda et al. |
| 7,130,287 B2 | 10/2006 | Nounin et al. |
| 7,130,311 B2 | 10/2006 | Yavuz et al. |
| 7,139,274 B2 | 11/2006 | Attar |
| 7,142,562 B2 | 11/2006 | Yavuz et al. |
| 7,190,958 B1 | 3/2007 | Yarkosky |
| 7,209,758 B1 | 4/2007 | Moll et al. |
| 7,236,796 B2 | 6/2007 | Soliman |
| 7,245,915 B2 | 7/2007 | Matta et al. |
| 7,328,027 B1 | 2/2008 | Mangal |
| 7,394,789 B2 | 7/2008 | Sakawa et al. |
| 7,406,319 B2 | 7/2008 | Kostic et al. |
| 7,411,923 B2 | 8/2008 | Attar et al. |
| 7,411,974 B2 | 8/2008 | Attar et al. |
| 7,426,180 B2 | 9/2008 | Xu |
| 7,426,395 B2 | 9/2008 | Stephens |
| 7,433,682 B1 | 10/2008 | Moll et al. |
| 7,440,431 B2 | 10/2008 | Sindhushayana et al. |
| 7,474,627 B2 | 1/2009 | Chheda et al. |
| 7,486,645 B2 | 2/2009 | Li et al. |
| 7,496,058 B2 | 2/2009 | Kim et al. |
| 7,602,722 B2 | 10/2009 | Chheda |
| 7,729,243 B2 | 6/2010 | Ananthaiyer |
| 7,742,768 B2 | 6/2010 | Liu et al. |
| 7,746,816 B2 | 6/2010 | Attar et al. |
| 7,751,839 B2 | 7/2010 | Bowers et al. |
| 7,764,651 B2 | 7/2010 | Kwon |
| 7,822,064 B2 | 10/2010 | Thubert |
| 7,852,759 B2 | 12/2010 | Stephenson |
| 7,894,488 B2 | 2/2011 | Shim |
| 7,921,348 B2 | 4/2011 | Seidel et al. |
| 7,953,048 B2 | 5/2011 | Yoon et al. |
| 8,014,280 B2 | 9/2011 | Zhang et al. |
| 8,040,803 B1 | 10/2011 | Pawar et al. |
| 8,094,623 B2 | 1/2012 | Attar et al. |
| 8,107,438 B1 | 1/2012 | Singh et al. |
| 2002/0061749 A1 | 5/2002 | Hunzinger |
| 2002/0151310 A1 | 10/2002 | Chung et al. |
| 2002/0191693 A1 | 12/2002 | Nakagaki |
| 2003/0017831 A1 | 1/2003 | Lee et al. |
| 2003/0064741 A1 | 4/2003 | Silva et al. |
| 2003/0072278 A1 | 4/2003 | Wu et al. |
| 2003/0095551 A1 | 5/2003 | Gotoh |
| 2003/0114172 A1 | 6/2003 | Soliman |
| 2003/0117956 A1 | 6/2003 | Lee |
| 2003/0129982 A1 | 7/2003 | Perini |
| 2003/0163558 A1 | 8/2003 | Cao et al. |
| 2003/0195006 A1 | 10/2003 | Choong et al. |
| 2004/0017860 A1 | 1/2004 | Liu |
| 2004/0057420 A1 | 3/2004 | Curcio et al. |
| 2004/0071086 A1 | 4/2004 | Haumont et al. |
| 2004/0179525 A1 | 9/2004 | Balasubramanian et al. |
| 2004/0196852 A1 | 10/2004 | Aksu et al. |
| 2004/0213182 A1 | 10/2004 | Huh et al. |
| 2004/0218533 A1 | 11/2004 | Kim et al. |
| 2004/0259565 A1 | 12/2004 | Lucidarme |
| 2005/0032522 A1 | 2/2005 | Soong et al. |
| 2005/0052996 A1 | 3/2005 | Houck et al. |
| 2005/0111397 A1 | 5/2005 | Attar et al. |
| 2005/0130663 A1 | 6/2005 | Hong et al. |
| 2005/0153695 A1 | 7/2005 | Cho |
| 2005/0159165 A1 | 7/2005 | Argyropoulous et al. |
| 2005/0201289 A1 | 9/2005 | Smolinske et al. |
| 2005/0250509 A1 | 11/2005 | Choksi |
| 2005/0286440 A1 | 12/2005 | Strutt et al. |
| 2006/0077994 A1 | 4/2006 | Spindola et al. |
| 2006/0121855 A1 | 6/2006 | Dillon |
| 2006/0126509 A1 | 6/2006 | Abi-Nassif et al. |
| 2006/0159051 A1 | 7/2006 | English |
| 2006/0182062 A1 | 8/2006 | Sdralia et al. |
| 2006/0223585 A1 | 10/2006 | Legg |
| 2006/0229087 A1 | 10/2006 | Davis, III et al. |
| 2006/0250953 A1 | 11/2006 | Mooney et al. |
| 2006/0252429 A1 | 11/2006 | Chen et al. |
| 2006/0268764 A1 | 11/2006 | Harris |
| 2006/0291383 A1 | 12/2006 | Bi et al. |
| 2007/0060165 A1 | 3/2007 | Black et al. |
| 2007/0099648 A1 | 5/2007 | Kim et al. |
| 2007/0109967 A1 | 5/2007 | Ha |
| 2007/0127407 A1 | 6/2007 | Attar et al. |
| 2007/0127522 A1 | 6/2007 | Lundh et al. |
| 2007/0177510 A1 | 8/2007 | Natarajan et al. |
| 2007/0178906 A1 | 8/2007 | Gao et al. |
| 2007/0183427 A1* | 8/2007 | Nylander et al. ......... 370/395.2 |
| 2007/0197223 A1 | 8/2007 | Jung et al. |
| 2007/0201438 A1 | 8/2007 | Yoon et al. |
| 2007/0201439 A1 | 8/2007 | Sun et al. |
| 2007/0274257 A1 | 11/2007 | Bae et al. |
| 2008/0008093 A1 | 1/2008 | Wang |
| 2008/0049699 A1 | 2/2008 | Li et al. |
| 2008/0049706 A1 | 2/2008 | Khandekar et al. |
| 2008/0130495 A1 | 6/2008 | Dos Remedios et al. |
| 2008/0186862 A1* | 8/2008 | Corbett et al. ................ 370/237 |
| 2008/0188228 A1 | 8/2008 | Pecen et al. |
| 2008/0207170 A1* | 8/2008 | Khetawat et al. ............. 455/411 |
| 2008/0233967 A1 | 9/2008 | Montojo et al. |
| 2008/0247450 A1 | 10/2008 | Alexander |
| 2008/0280615 A1 | 11/2008 | Vinayakray-Jani |
| 2009/0059790 A1 | 3/2009 | Calvert et al. |
| 2009/0088157 A1 | 4/2009 | Aaron |
| 2009/0141683 A1 | 6/2009 | Grinshpun et al. |
| 2009/0170547 A1 | 7/2009 | Raghothaman et al. |
| 2009/0187690 A1* | 7/2009 | Smart et al. ................... 710/105 |
| 2009/0257361 A1 | 10/2009 | Deshpande et al. |
| 2009/0262720 A1* | 10/2009 | Kwon et al. ................... 370/342 |
| 2009/0285159 A1 | 11/2009 | Rezaiifar |
| 2009/0288145 A1 | 11/2009 | Huber et al. |
| 2010/0014487 A1 | 1/2010 | Attar et al. |
| 2010/0189096 A1 | 7/2010 | Flynn et al. |
| 2010/0240373 A1* | 9/2010 | Ji et al. ......................... 455/436 |
| 2010/0271962 A1 | 10/2010 | Han et al. |
| 2010/0296407 A1 | 11/2010 | Medvedev et al. |
| 2010/0309861 A1 | 12/2010 | Gorokhov et al. |
| 2011/0053596 A1* | 3/2011 | Wohlert et al. ............... 455/436 |
| 2011/0085607 A1* | 4/2011 | Dhandu et al. ................ 375/259 |
| 2011/0116419 A1 | 5/2011 | Cholas et al. |
| 2011/0292785 A1 | 12/2011 | Hardin |
| 2012/0044908 A1 | 2/2012 | Spinelli et al. |

OTHER PUBLICATIONS

U.S. Appl. No. 12/478,318, Notice of Allowance dated Jan. 30, 2012.
Unpublished U.S. Appl. No. 12/141,569, filed Jun. 18, 2008 entitled "Method for Initiating Handoff of a Wireless Access Terminal Based on the Reverse Activity Bit".
Unpublished U.S. Appl. No. 12/432,736, filed Apr. 29, 2009 entitled "Using DRCLocks for Conducting Call Admission Control".
Unpublished U.S. Appl. No. 12/350,694, filed Jan. 8, 2009 entitled "Using Packet-Transport Metrics for Call-Admission Control".
Unpublished U.S. Appl. No. 12/397,855, filed Mar. 4, 2009 entitled "Using Packet-Transport Metrics for Setting DRCLocks".
Unpublished U.S. Appl. No. 12/494,999, filed Jun. 30, 2009 entitled "Implementing Quality of service (QoS) by Using Hybrid ARQ (HARQ) Response for Triggering the EV-DO Reverse Activity Bit (RAB)".
Unpublished U.S. Appl. No. 12/507,913, filed Jul. 23, 2009 entitled "Achieving Quality of Service (QoS) by Using the Reverse Activity Bit (RAB) in Creation of Neighbor Lists for Selected Access Terminals".
Unpublished U.S. Appl. No. 11/746,229, filed May 29, 2007 entitled "Using VoIP-Quality Metrics to Dynamically Adjust the EV-DO Reverse Activity Bit".

Unpublished U.S. Appl. No. 12/478,318, filed Jun. 4, 2009 entitled "Method and System for Controlling Data Rates Based on Backhaul Capacity".
Unpublished U.S. Appl. No. 12/538,624, filed Aug. 10, 2009 entitled "T1 Throttle Based Reva Data Rate Control".
Unpublished U.S. Appl. No. 12/731,895, filed Mar. 25, 2010 entitled "EVDO Coverage Modification Based on Backhaul Capacity".
R. Ferrus et al., "Evaluation of a Cell Selection Framework for Radio Access Networks considering Backhaul Resource Limitations," The 18th Annual IEEE International Symposium on Personal, Indoor and Mobile Radio Communications (PIMRC'07).
Emilio Mino et al., "IST-4-027756 WINNER II, D4.8.3, Integration of Cooperation on WINNER II System Concept," Information Society Technologies, Nov. 29, 2007.
Gregory Conklin et al., "Video Coding for Streaming Media Delivery on the Internet,", IEEE Transactions on Circuits and Systems for Video Technology, vol. 11, No. 3, Mar. 2001.
International Search Report and Written Opinion from International Application No. PCT/US2007/009296, dated Oct. 17, 2007.
Xin Liu et al., "Experiences in a 3G Network: Interplay between the Wireless Channel and Applications," MobiCom '08, Sep. 14-19, 2008.
Woon-Young Yeo et al., "Traffic Management of High-Speed CDMA Systems Base on Loan Prediction," IEICE Electronics Express, vol. 6, No. 7, pp. 389-394, published Apr. 10, 2009.
3rd Generation Partnership Project 2, "cdma2000 High Rate Packet Data Air Interface," 3GPP2 C.S0024-0, v. 4.0 (Oct. 2002).
3rd Generation Partnership Project 2, "cdma2000 High Rate Packet Data Air Interface," 3GPP2 C.S0024-A, v. 3.0 (Sep. 2006).
U.S. Appl. No. 12/141,569, Notice of Allowance dated Sep. 28, 2011.
U.S. Appl. No. 12/388,199, Final Office Action dated Oct. 11, 2011.
U.S. Appl. No. 12/478,318, Non-Final Office Action dated Oct. 27, 2011.
U.S. Appl. No. 12/388,199 dated Feb. 18, 2009.
U.S. Appl. No. 11/746,229, Pre-Interview Communication dated Dec. 30, 2009.
U.S. Appl. No. 11/746,229, First Action Interview Summary dated Jun. 2, 2010.
U.S. Appl. No. 11/746,229, Notice of Allowance dated Aug. 3, 2010.
U.S. Appl. No. 11/746,229, Interview Summary dated Apr. 6, 2010.
U.S. Appl. No. 12/141,569, Non-Final Office Action dated Mar. 22, 2011.
U.S. Appl. No. 12/350,693, Non-Final Office Action dated Jun. 22, 2010.
U.S. Appl. No. 12/350,694, Final Office Action dated Dec. 9, 2010.
U.S. Appl. No. 12/350,694, Non-Final Office Action dated Feb. 18, 2011.
U.S. Appl. No. 12/350,694, Notice of Allowance mailed Jun. 10, 2011.
U.S. Appl. No. 12/397,855, Non Final Office Action dated Oct. 12, 2010.
U.S. Appl. No. 12/397,855, Final Office Action dated Apr. 1, 2011.
U.S. Appl. No. 12/388,199, Non-Final Office Action dated Mar. 30, 2011.
U.S. Appl. No. 12/478,318, Non Final Office Action dated Dec. 8, 2010.
U.S. Appl. No. 12/397,855, Non-Final Office Action dated Dec. 5, 2011.
U.S. Appl. No. 12/731,895, Non Final Office Action dated Mar. 23, 2012.
U.S. Appl. No. 12/432,736, Non Final Office Action dated Mar. 27, 2012.
U.S. Appl. No. 12/494,999, Notice of Allowance dated Mar. 30, 2012.
Rosenberg, J. et al., "SIP: Session Initiation Protocol," Network Working Group, Request for Comments: 3261, Jun. 2002, pp. 1-265.
3rd Generation Partnership Project, "cdma2000 Femtocell Network: 1x and IMS Network Aspects," 3GPP2 X. S0059-2000-0, Version 1.0, Jan. 2010.
Kjellberg, Richard, "Analysis of an AIS Implementation in Tokyo Bay," web.archive.org/web/20090427053120/http://www.gpc.se/tokyo/tokyo.htm (Apr. 27, 2009).
Xing, Jianping et al., "Research and Integration of Marine Embedded AIS Information Terminal," Proceedings of the 7th World Congress on Intelligent Control and Automation, Jun. 25-27, 2008, Chongqing, China, pp. 3586-3589.
Openwave, "Overview of Location Technologies," Nov. 19, 2002, 12 pages.

* cited by examiner

FIG. 3

| WCD IDENTIFIER | ALLOW / DENY |
|---|---|
| 800-555-1001 | ALLOW |
| 8005551002@IMS.ORG | ALLOW |
| SIP:USER@XYZ.COM | ALLOW |
| 00-0D-EA-CA-17-42 | DENY |
| 192.168.1.114 | ALLOW |

300 →

305 →
310 →
315 →
320 →
325 →

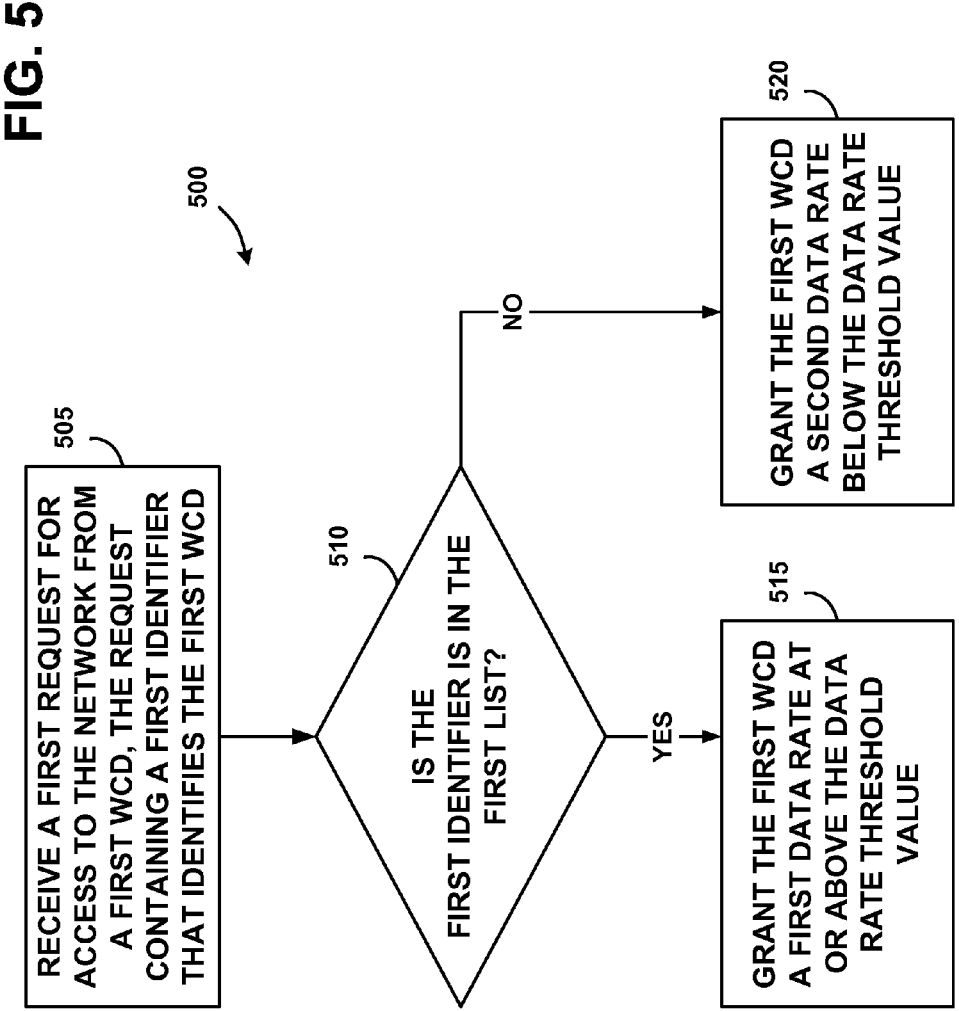

METHODS AND DEVICES FOR LIMITING ACCESS TO FEMTOCELL RADIO ACCESS NETWORKS

BACKGROUND

Femtocell radio access networks (RANs) typically provide wireless telephony and/or data services to a limited geographical region, such as a residence or a business. A femtocell device may be deployed in such a region to provide base transceiver station (BTS) functions, base station controller (BSC) functions, or both, to wireless communication devices (WCDs). Consequently, a femtocell device may radiate to define one or more limited-range wireless coverage areas. Such an arrangement can provide modest wireless coverage to areas that may not be well-served by macro-cellular wireless coverage areas. Femtocell devices may also be low-cost (at least when compared to analogous macro-cellular devices), and may exhibit a relatively small physical size.

In addition to these advantages, femtocell RANs may also have drawbacks. For instance, a femtocell device that is deployed in a privately-owned location, such as a residence or business, is typically intended to only be used by individuals who live at the residence or work at the business. Without some way to control access to the femtocell RAN, nearby users may be able to gain access to and use the wireless resources of the femtocell RAN. Such use may have a deleterious impact on the performance and security of legitimate users of the femtocell RAN.

OVERVIEW

The embodiments herein are directed to giving the owner of a femtocell device control over which WCDs are able to use how much of the femtocell device's services. For instance, the owner might want to limit or completely prohibit some individuals from using the femtocell device's wireless capacity. However, the owner may want to be able to grant full access to the femtocell device's wireless services to certain individuals that are known to or trusted by the owner. Thus, the owner may want to allow family, friends, and certain acquaintances to use the femtocell device, while limiting or preventing use of the femtocell device by all others.

One way in which to accomplish at least part of this goal is through the use of a whitelist of WCD identifiers provisioned at or available to the femtocell device. These identifiers may include, but are not limited to, Network Access Identifiers (NAIs), Mobile Directory Numbers (MDNs), International Mobile Subscriber Identifiers (IMSIs), electronic serial numbers (ESNs), and/or mobile equipment identifiers (MEIDs). When a WCD using a WCD identifier that is not in the whitelist attempts to access the femtocell device, the femtocell device may deny service to that WCD.

However, heavy use of whitelists on femtocell devices may be adverse to the interests of wireless service providers. For example, one of the wireless service provider's incentives for widespread deployment of femtocell devices is a reduction of traffic load on the wireless service provider's macro-cellular network. A femtocell device provisioned with a whitelist may result in traffic that would otherwise be handled by the femtocell device to instead be handled by the macro-cellular network.

In order to overcome this drawback, a femtocell device may be provisioned with a "greylist" of WCD identifiers. Unlike the case for a whitelist, a femtocell device provisioned with a greylist typically does not ban WCDs not in the greylist from accessing the femtocell device. Instead, femtocell device may provide only a limited degree of service to non-greylisted WCDs. For instance, the femtocell device may limit the maximum data rates of non-greylisted WCDs to less than a threshold value. In this way, non-greylisted WCDs can make use of the femtocell device and traffic on the macro-cellular network is reduced.

However, the limited maximum data rates of the non-greylisted WCDs may prevent these WCDs from using more than a given amount of the capacity of the femtocell device or the capacity of a backhaul connection between the femtocell device and another network component. Thus, the impact of non-greylisted WCDs on the service quality of greylisted WCDs may be mitigated. Therefore, the interests of the owner, greylisted WCDs, non-greylisted WCDs, and the wireless service provider are preserved.

In an example embodiment, a femtocell device may be communicatively coupled to a network, such as a private IP network or the Internet. The femtocell device may radiate to define a wireless coverage area that serves WCDs, and may store one or more WCD identifiers in a greylist.

The femtocell device may receive a request for access to the network from a first WCD, the request containing a first WCD identifier that identifies the first WCD. In response to receiving the request, the femtocell device may determine that the first WCD identifier is in the greylist, and then grant the first WCD a data rate at or above a pre-determined data rate threshold value.

The femtocell device may also receive another request for access to the network from a second WCD. This request may contain a second WCD identifier that identifies the second WCD. In response to receiving the this request, the femtocell device may determine that the second WCD identifier is not in the greylist, and then grant the second WCD a data rate below the data rate threshold value.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 3 is a table of WCD identifiers that may be used as a greylist, in accordance with an example embodiment;

FIG. 5 is a flow chart of a method, in accordance with an example embodiment.

DESCRIPTION

In accordance with example embodiments, methods and devices for limiting access to femtocell RANs are presented. Preferably, a femtocell device is arranged to provide wireless service to nearby WCDs. When such a WCD attempts to register with the femtocell device, the femtocell device may grant the WCD a maximum data rate based on whether the WCD has been greylisted, as well as possibly based on other factors. In order to provide sufficient service quality to grey-listed WCDs, the femtocell device may grant non-greylisted WCDs a maximum data rate that is limited to a portion of the capacity of a backhaul link that connects the femtocell device to one or more other network components.

I. SYSTEM ARCHITECTURE

Figure 1:
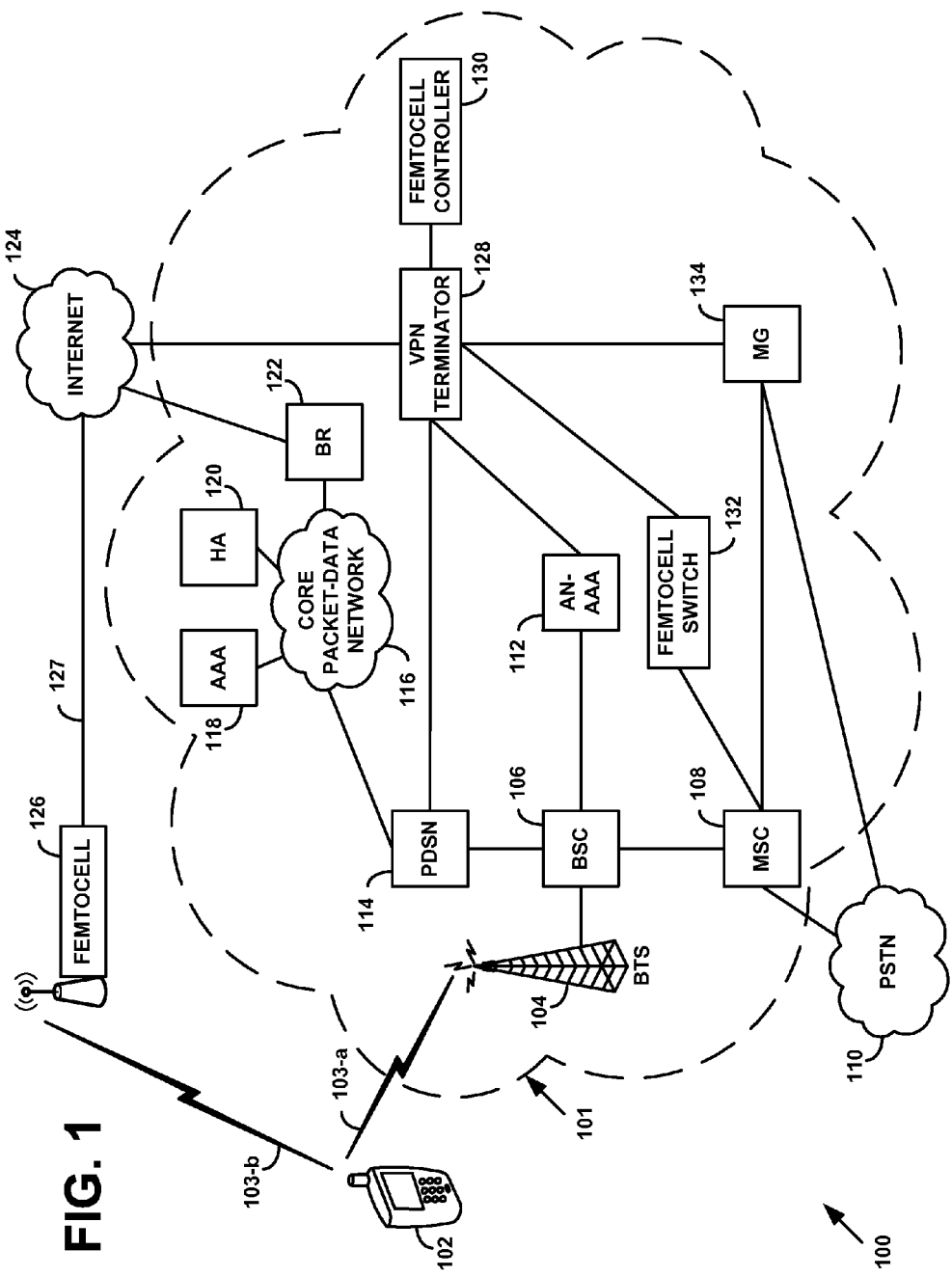
FIG. 1 depicts a network architecture, in accordance with an example embodiment.

FIG. 1 shows a simplified block diagram of a wireless communication network 100 that can be operated by a wireless service provider, and in which an example embodiments can be deployed. Communication network 100 may operate according to various technologies including, but not limited to, Code-Division Multiple Access (CDMA), Worldwide Interoperability for Microwave Access (WIMAX®), Universal Mobile Telecommunications System (UMTS®), Long Term Evolution (LTE®), IDEN®, or 802.11 (Wifi). Thus, users may engage in communication via WCDs that support one or more of these or other technologies.

As shown, WCD 102 may communicate with a macro-cellular RAN 101 over an air interface 103-a. In particular, WCD 102 air interface 103-a may be provided by BTS 104, which may be coupled or integrated with BSC 106. WCD 102 is also shown as having an air interface 103-b with femtocell device 126.

Transmissions over air interface 103-a from BTS 104 to WCD 102 may utilize a "forward link," while transmissions over air interface 103-a from WCD 102 to BTS 104 may utilize a "reverse link." Similarly, transmissions over air interface 103-b from femtocell device 126 to WCD 102 may utilize a forward link, while transmissions over air interface 103-b from WCD 102 to femtocell device 126 may utilize a reverse link. Each forward link and reverse link may comprise one or more logical traffic channels. Furthermore, the links of air interfaces 103-a and 103-b could be active concurrently or possibly at different times, depending on the operational state of WCD 102, the physical location of WCD 102 with respect to BTS 104 and femtocell device 126, and the type of communication session WCD 102 seeks or is engaged in.

BSC 106 may serve to control assignment of traffic channels (e.g., over air interface 103-a). BSC 106 may also be connected to mobile switching center (MSC) 108, which in turn may provide access to wireless circuit-switched services such as circuit-voice and circuit-data (e.g., modem-based packet data) service.

As represented by its connection to public-switched telephone network (PSTN) 110, MSC 108 may also be coupled with one or more other MSCs, other telephony circuit switches in the wireless service operator's (or in a different operator's) network, or other wireless communication systems. In this way, wireless communication network 100 may support user mobility across MSC regions, roaming between systems, and local and long-distance landline telephone services. Of course, part or all of MSC 108 may be replaced by softswitch components (not shown) that transport voice and other media over packet-switched networks.

BSC 106 may also be connected to access network authentication, authorization, and accounting (AN-AAA) server 112. AN-AAA server 112 may support link-level authentication and authorization for WCD data sessions. Data transport may be provided by way of a communicative link between BSC 106 and packet-data serving node (PDSN) 114, which in turn provides connectivity with the wireless service provider's core packet-data network 116. Nodes that may reside within or adjunct to core packet-data network 116 are, by way of example, an authentication, authorization, and accounting (AAA) server 118, a mobile-IP home agent (HA) 120, and a border router (BR) 122.

PDSN 114 may be a router-like device that manages the connectivity of WCDs to a packet-switched network, such as the core packet-data network 116, the Internet 124, or one or more private IP networks (not shown). In an example embodiment, PDSN 114 may serve tens, hundreds or thousands of WCDs via point to point protocol (PPP) links to each of these WCDs. However, a PPP link to a WCD is not required for PDSN 114 to serve a WCD. Preferably, PDSN 114 is capable of serving as a mobile-IP foreign agent. For example, PDSN 114 may be substantially compliant with the Internet Engineering Task Force Request For Comments (RFC) 2002 ("IP Mobility"), which is herein incorporated by reference in its entirety.

HA 120 is preferably an anchor point for WCDs that support mobile-IP. While a WCD, such as WCD 102, may change its point of attachment from one foreign agent to another (e.g., from one PDSN to another) as it roams between wireless coverage areas, WCD 110 preferably maintains a registration with the same HA. Furthermore, in order to maintain a substantially static home IP address, the WCD may receive a home IP address assignment from a HA.

AAA server 118 may provide network- and service-layer authentication and authorization support, and could be combined with AN-AAA server 112. Accordingly, AAA server 118 may support one or more of the well known network protocols RADIUS (see for example, RFC 2865, "Remote Authentication Dial In Subscriber Service (RADIUS)," herein incorporated by reference in its entirety) and DIAMETER (see for example, RFC 3588, "Diameter Base Protocol," herein incorporated by reference in its entirety). AAA server 118 may maintain a profile for each WCD registered with the wireless service provider. Further, AAA server 118 may maintain profiles for other WCDs as well. Such a profile may contain an indication of the identity of each WCD and the WCD's subscriber (e.g., the WCD's user). For example, a profile for a given WCD may include the given WCD's NAI, MDN, IMSI, ESN, and/or MEID. Such a profile may also include a username, a password, and/or any other information related to the given WCD. Preferably, PDSN 114, HA 120, or both authenticate WCD sessions and/or service requests from WCDs with AAA server 118.

BR 122 may seek to provide secure connectivity to the Internet 124. To that end, BR 122 could include a firewall, packet filter, and/or other security mechanisms. Thus, BR 122 may serve to protect core packet-data network 116, as well as macro-cellular RAN 101 in general, from potential attacks (e.g., hacking attempts, denial of service attacks, viruses, or malware) emanating from the Internet 124 or other IP networks.

Core packet-data network 116 could comprise one or more additional switches, routers, and gateways (not shown) that collectively provide transport and interconnection among the various entities and networks of macro-cellular RAN 101. In this context, for instance, core packet-data network 116 could be an overlay on or a sub-network of one or more additional networks.

Continuing with the description of FIG. 1, macro-cellular RAN 101 may also include a virtual private network (VPN) terminator 128. VPN terminator 128 may be a standalone component or combined with BR 122, HA 120, or other components of macro-cellular RAN 101. VPN terminator 128 may serve as an endpoint for secure connections with authorized devices seeking access to macro-cellular RAN 101 via unsecure, external networks such as the Internet 124.

For instance, femtocell device 126 may connect to Internet 124 over a broadband connection 127 (e.g., a cable modem, digital subscriber line (DSL), or T-carrier connection) and then to VPN terminator 128. (Broadband connection 127 may be classified as a type of backhaul connection.) Femtocell device 126 could include a VPN client component that establishes a secure tunnel with VPN terminator 128, such that packet-data communications over the secure tunnel between femtocell device 126 and VPN terminator 128 can then take place securely. Secure tunnels can be implemented according such protocols as IP Security (IPsec), although other mechanisms may be employed.

Assuming a secure VPN connection is established between femtocell device 126 and VPN terminator 128, femtocell device 126 may then communicate securely with other entities in macro-cellular RAN 101 by way of the VPN terminator 128. In particular, femtocell device 126 may receive configuration and messaging data and other operational parameters from femtocell controller 130. Femtocell controller 130 may also provide similar control and services for other femtocell devices connected to network macro-cellular RAN 101.

Femtocell switch 132 may act as a signaling gateway between MSC 108 and VPN terminator 128, enabling access terminals communicating via femtocell device, such as WCD 102 via femtocell device 126, to engage in calls via MSC 108 to other wireless devices, as well as over PSTN 310. Media translation between packet-based media data and circuit-based media data may be carried out by media gateway (MG) 134. Thus, femtocell device 126 may transmit packetized data to MG 134 via VPN terminator 128. MG 134 may in turn translate or transcode the data to circuit-based media for transmission on PSTN 110, for example. MG 134 may perform the reverse translation for transmission in the opposite direction.

It should be understood that the term radio network controller (RNC) can also be used to refer to a BSC, or a combination BTS/BSC. Accordingly, a femtocell device may be considered to be form of micro-type RNC. Preferably, a femtocell device is deployed on user premises, such as within a residence or within a business, to provide additional wireless network coverage to that residence or business. However, femtocell devices can, in general, be deployed anywhere to provide wireless network coverage. Thus, wireless coverage areas defined by femtocell devices may overlap with wireless coverage areas from macro-cellular RNCs. WCDs may seek to register with either a femtocell device or a macro-cellular RNC based on the respective signal strengths that the WCD receives from each of these devices, and/or based on other factors. For instance a WCD may be arranged to prefer using a femtocell device over a macro-cellular RNC when both are available.

Furthermore, a femtocell device typically has a small form factor, as least when compared to that of a macro-cellular RNC, so that the femtocell device can be easily deployed in a location, or moved between locations. Thus, for instance, femtocell devices may be sold directly to consumers, in stores or online, and may be deployed by consumers in a residential or business network. As discussed above, a femtocell device may be directly or indirectly coupled to a residential or business broadband network service, such as a cable modem, DSL, or T-carrier connection, so that the femtocell device can communicate via the Internet. This use of wireline access to the Internet serves to offload traffic from macro-cellular RANs.

Additionally, a femtocell device may be configured to provide either voice service, data service, or both, to WCDs. Thus, in some arrangements, a femtocell device may provide data service to WCDs, but if these WCDs attempt to use the femtocell device for voice calls, the femtocell device may redirect WCDs to a macro-cellular RNC. In other arrangements, the femtocell device may support circuit voice or voice-over-IP services for these WCDs. Alternatively, other means may be used to distribute voice and data services between the femtocell device and a macro-cellular RNC.

With respect to the various business entities involved in communication network 100, it is generally assumed throughout this specification that femtocell device 126 is provided by, or at least associated with, the same wireless service provider that operates macro-cellular RAN 101. But, this need not be the case. Various business models may be in place through which other entities provide, manage, and/or support femtocell device 126. Additionally, it is also generally assumed that the individual who uses WCD 102 is an account holder for both WCD 102 and femtocell device 126 (i.e., the individual is a subscriber of the wireless service provider and his or her service plan includes WCD 102 and femtocell device 126). But again, this need not be the case.

It should also be understood that the depiction of just one of each network component in FIG. 1 is illustrative, and there could be more than one of any component. Communication network 100 may also contain other types of components not shown. Alternatively or additionally, any network component in FIG. 1 could be omitted, or combined with another network component, without departing from the scope of the invention. Thus, the particular arrangement shown in FIG. 1 should not be viewed as limiting with respect to the present invention.

Further, the network components that make up a wireless communication system such as communication network 100 are typically implemented as a combination of one or more integrated and/or distributed platforms, each comprising one or more computer processors, one or more forms of computer-readable storage (e.g., disks drives, random access memory, etc.), one or more communication interfaces for interconnection between components and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein.

Figure 2:
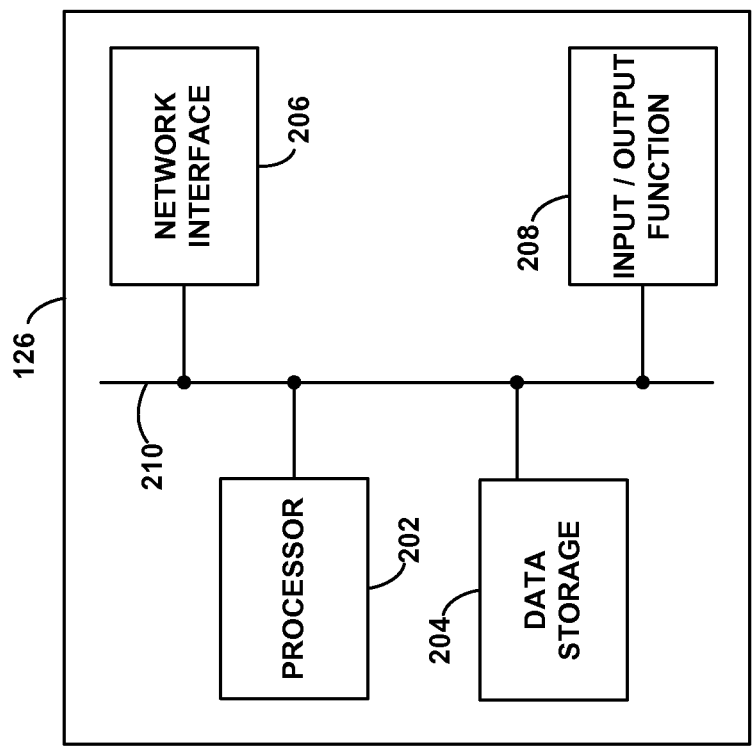
FIG. 2 is a block diagram of a femtocell device, in accordance with an example embodiment.

To that end, FIG. 2 is a simplified block diagram exemplifying femtocell device 126 and illustrating some of the functional components that would likely be found in a femtocell device arranged to operate in accordance with the embodiments herein. Example femtocell device 126 could include the functionality of any type of RAN component, such as a BTS, a BSC, an RNC, a PDSN, a BR, and so on.

Example femtocell device 126 preferably includes a processor 202, a data storage 204, a network interface 206, and an input/output function 208, all of which may be coupled by a system bus 210 or a similar mechanism. Processor 202 preferably includes one or more CPUs, such as one or more general purpose processors and/or one or more dedicated processors (e.g., application specific integrated circuits (ASICs) or digital signal processors (DSPs), etc.) Data storage 204, in turn, may comprise volatile and/or non-volatile data storage and can be integrated in whole or in part with processor 202.

Data storage 204 preferably holds program instructions executable by processor 202, and data that is manipulated by these instructions, to carry out the various methods, processes, or functions described herein. (Alternatively, these methods, processes, or functions can be defined by hardware, firmware, and/or any combination of hardware, firmware and software.) By way of example, the data in data storage 204 may contain program instructions executable by processor 202 to carry out any of the methods, processes, or functions disclosed in this specification or the accompanying drawings.

Network interface 206 may take the form of one or more wireless and/or wireline interfaces. For example, network interface 206 may comprise transceiver(s) that radiate to define a wireless coverage area. This wireless coverage area may include an air interface, such as air interface 103-b, for engaging in communication with WCDs. Network interface 206 may also comprise a wireline interface, for example to a broadband connection, to communicate with the Internet or other IP networks. Accordingly, network interface 206 may take the form of one or more wireless interfaces, such as IEEE 802.11 (Wifi), or BLUETOOTH®. Alternatively or additionally, network interface 206 may take the form of one or more wireline interfaces, such as Ethernet or Token Ring. However, other forms of physical layer connections and other types of standard or proprietary communication protocols may be used with network interface 206.

Input/output function 208 facilitates user interaction with example femtocell device 126. Input/output function 208 may comprise multiple types of input devices, such as a keyboard, a mouse, a touch screen, and so on. Similarly, input/output function 208 may comprise multiple types of output devices, such as a monitor, printer, or one or more light emitting diodes (LEDs). Additionally or alternatively, femtocell device 126 may support remote access from another device, via network interface 206 or via another interface (not shown), such an RS-232 or universal serial bus (USB) port.

II. CONTROLLING ACCESS TO FEMTOCELL SERVICES

Given that femtocell devices may be deployed to provide additional wireless coverage to private residences, businesses, or virtually any other location, the security of these femtocell devices may be a consideration. In particular, the "owner" of a femtocell device might want to be able to prevent unauthorized individuals and WCDs from gaining access to the femtocell device's services.

For sake of convenience, the "owner" of a femtocell device will be assumed to be a party that holds an account with the wireless service provider, and that the femtocell device is registered with this account. The owner may also control access to the femtocell device and/or physical access to the location at which the femtocell device is deployed. In general, however, the owner of a femtocell device could be a different party. As an example, femtocell devices may be leased from a wireless service provider.

If a femtocell device is deployed in a private residence, the owner of the femtocell device might want to prohibit individuals in neighboring residences, or individuals lurking nearby the private residence, from using the femtocell device's wireless capacity. Either knowingly or unintentionally, these individuals could use a majority of the femtocell device's capacity, thereby reducing the quality of the wireless service available to the owner. However, the owner may want to be able to grant access to the femtocell device to certain individuals and WCDs that are known or trusted by the owner. Thus, for example, the owner may want to allow friends and family to use the femtocell device, while preventing all others from using the femtocell device.

One way in which to accomplish this goal is through the use of a whitelist of WCD identifiers deployed on, or accessible to, the femtocell device. As will be described in more detail below, a WCD identifier may be an address, number, string of characters, or other type of token that can be used to identify a WCD or the user of a WCD. By placing the WCD identifiers of known or trusted WCDs in such a whitelist, the owner of the femtocell device may be effectively instructing the femtocell device to provide service only to WCDs associated with one of the listed WCD identifiers. Thus, if a WCD with a WCD identifier that is not in the whitelist attempts to use the femtocell device, the femtocell device may deny service to that WCD.

While whitelists are a relatively simple and effective means of controlling access to a femtocell device, they do have some disadvantages. For example, one of the incentives for widespread deployment of femtocell devices is a reduction of traffic load on the wireless service provider's macro-cellular network. Since macro-cellular RAN equipment is typically expensive, the wireless service provider may not be able to cover all possible geographic locations sufficiently. Thus, there may be locations where there is relatively little wireless coverage. Or, in densely-populated areas, the macro-cellular network capacity may be heavily utilized. Thus, the wireless service provider may want to encourage use of femtocell devices to offload its macro-cellular network. However, the amount of traffic offload from the macro-cellular network may be limited if whitelists are deployed on these femtocell devices.

Accordingly, a femtocell device may be provisioned with a "greylist" of WCD identifiers. Unlike the case of a whitelist, a femtocell device does not ban WCDs not present in a greylist from accessing the femtocell device. Instead, a greylist may instruct the femtocell device to provide a full degree of service to greylisted WCDs, and to provide a limited degree of service to non-greylisted WCDs.

This limited degree of service can be realized in a number of ways. For instance, the femtocell device may limit the maximum data rates of non-greylisted WCDs to less than a threshold value, while granting greylisted WCDs maximum data rates at or above the threshold value. The limited maximum data rates of the non-greylisted WCDs may prevent these WCDs from using more than a given amount of the capacity of the femtocell device or the capacity of the backhaul connection between the femtocell device and one or more other network components.

Alternatively or additionally, the femtocell device may apply a lower priority or quality-of-service to packets originated by or transmitted to non-greylisted WCDs, while applying a higher priority or quality-of-service to packets originated by or transmitted to greylisted WCDs. Another alternative is for the femtocell device to limit the applications and services of non-greylisted WCDs so that, e.g., non-greylisted WCDs cannot use high-capacity applications or services such as video streaming or file sharing. In yet another alternative, the femtocell device may limit the number of bytes that each non-greylisted WCD can transmit in a given period of time (e.g., the femtocell device may permit each non-greylisted WCD to transmit and/or receive no more than 5 megabytes per hour). In full generality, the femtocell device may limit the access or network utilization of non-greylisted WCDs in accordance with various criteria, and the examples described herein should not be viewed as exhaustive.

A greylist may also allow certain WCDs to be banned from using the femtocell device. For example, the owner of the femtocell device may have a particular neighbor who frequently makes use of the femtocell device. The owner may find this use irritating, even if the use is limited to a relatively low data rate or only certain applications. Thus, greylists may include entries specifying that a WCD with a particular WCD identifier should be denied access to the femtocell device altogether.

Overall, the use of greylists on femtocell devices can be viewed as a winning situation for all parties involved. The wireless service provider is able to offload traffic from its macro-cellular network to femtocell devices, thus reducing its need for large capital expenditures. Users of non-greylisted WCDs may still receive better wireless service from the femtocell device than they would from the macro-cellular network. And, the owner of the femtocell device is granted control over the femtocell device, with the ability to prevent non-greylisted WCDs from making excessive use of the femtocell device's services, or to ban these WCDs altogether.

FIG. 3 is a table 300 of an example greylist that is stored within, or is accessible to, a femtocell device. Table 300 is arranged in two columns, one containing WCD identifiers, the other containing an indication of whether the femtocell device will allow or deny a WCD with the corresponding WCD identifier access to services of the femtocell device. For WCDs with an identifier not included in table 300, i.e., non-greylisted WCDs, the femtocell device will preferably provide only a limited degree of service.

Thus, for example, entry 305 may indicate that the femtocell device will allow the WCD having phone number 800-555-1001 to have full service. Entries 310, 315, and 325 indicate the same principle for the WCDs having a network address identifier (NAI) or email address of 8005551002@IMS.ORG, the Session Initiation Protocol (SIP) uniform resource indicator (URI) of SIP:USER@XYZ.COM, and the IP address 192.168.1.114, respectively. However, entry 320 may indicate that the femtocell device will deny access to the WCD with the hardware address 00-0D-EA-CA-17-42. In this way, the owner of the femtocell device maintains control over WCDs that may access the femtocell device, as well as the degree of service that the femtocell device grants to each WCD.

While table 300 provides several example entries, the scope of this invention is not limited by these examples. Thus, different types of WCD identifiers may be used, and multiple WCD identifiers per WCD may be included. Furthermore, table 300 may store many more entries than shown in FIG. 3. Additionally, whether a femtocell device will allow or deny service to a given WCD, as well as the degree of service granted to greylisted and non-greylisted WCDs, could be represented in different ways. For instance, other representations aside from that of a table may be possible.

Regardless of the exact format or arrangement of table such as table 300, the information that is included in this table can be determined in a number of ways. For instance, a femtocell device might have an administrative interface that allows the owner of the femtocell device to manually enter the information in table 300. This interface could be, for example, web-based (e.g., accessible via the Hypertext Transport Protocol (HTTP)) and protected by requiring an appropriate userid and password to be entered.

On the other hand, a master copy of the information in table 300 could be stored in a macro-cellular device (e.g., femtocell controller 130 from FIG. 1) and accessible via an IP network such as the Internet. In this case, the owner of the femtocell device would be able to enter greylist information, again perhaps via an HTTP interface. Then, the femtocell device may be arranged to receive this information from the macro-cellular device on demand, periodically, or from time to time. For instance, when the femtocell device initializes, it may request the information from the macro-cellular device, and then download and install the information into a greylist.

Whether the information making up such a greylist is stored at the femtocell device, at a macro-cellular device, or elsewhere, an owner of the femtocell device preferably has control over the information. Thus, the owner may be able to effectively add, edit, and/or delete entries in the greylist.

However, it may be convenient for certain types of information to be automatically provisioned in the greylist. Many residential and business users may have multiple WCDs associated with a single account at a wireless service provider. For example, a residential owner of a femtocell device that is deployed in his or her home may have WCDs for himself or herself, as well as his or her spouse and children. Some or all of these WCDs may be associated with one another on a so-called "family plan." Accordingly, the greylist of the residential owner's femtocell device may be automatically provisioned with WCD identifiers of these WCDs so that the residential owner does not need to manually provision the WCD identifiers. For instance, a macro-cellular device may provide these WCD identifiers to the femtocell device on demand, periodically, or from time to time. Furthermore, when the WCD identifiers in the residential owner's family plan changes, a representation of the changes may be transmitted to the femtocell device.

Similarly, an owner of a femtocell device that is deployed at a location of business may have several, tens, or even hundreds of WCDs associated with one another on a "business plan." Accordingly, the greylist of business owner's femtocell device may be automatically provisioned with identifiers of all of these WCDs so that the business owner does not need to manually provision the identifiers. Like the in the case of the residential owner, when the WCD identifiers in the business owner's plan changes, a representation of the changes may be transmitted to the femtocell device.

A greylist may be automatically provisioned in other ways as well. For instance, many individuals now subscribe to instant messaging and social networking services, such as but not limited to GOOGLE TALK®, AIM®, YAHOO® Messenger, FACEBOOK®, LINKEDIN®, and MYSPACE®. While these services differ from one another to some extent, most have the common feature of allowing each subscriber to specify one or more other subscribers as "contacts" (some services may refer to contacts as "buddies" or "friends"). Thus, the femtocell device or a macro-cellular device may be arranged to acquire a list of WCD identifiers from one or more of these instant messaging and/or social networking services. The WCD identifiers in such a list may be associated with WCDs registered to the subscriber's contacts. For example, a contact entry from a social networking site might include the contact's name, postal address, email address, and phone number. The phone number is a type of WCD identifier that may be added to the greylist.

Thus, perhaps via an interface of the femtocell device or a macro-cellular device, the owner of the femtocell may specify an instant messaging or social networking account. The owner may also provide his or her credentials (e.g., a userid and password). Then, the femtocell device or macro-cellular device may download the owner's contact entries from the instant messaging or social networking account. However, not all WCD identifiers found in such contact entries are required to be added to the greylist. Instead, the owner may be given an opportunity to edit the downloaded list before they are added to the greylist.

Another way of automatically provisioning WCD identifiers into a greylist is to do so based on the locations of WCDs with respect to the location of the femtocell device. In some situations, it may be useful to automatically add a WCD identifier to a greylist when the associated WCD is within a certain radius of the femtocell device. Doing so might be based on the premise that when a femtocell device is deployed at a residence or business, it is usually possible to control physical access to the area nearby the femtocell device.

As an example, for a femtocell device deployed within a factory, it is likely that only authorized personnel are permitted within the factory. Thus, if a WCD is within a given distance of the femtocell device it is to be expected that the WCD (and the WCD's user) is inside the factory. Conversely, if a WCD is further than the given distance from the femtocell device, the WCD is expected to be outside of the factory.

In such a situation, it may be reasonable to presume that the WCD's user is authorized to be within the factory or is otherwise a guest on the premises. Authorized users or guests may be trusted by the owner of the femtocell device. Thus, the femtocell device may automatically grant such WCDs full service, even if the WCDs' identifiers do not appear in the greylist. Alternatively, the femtocell device may automatically add a WCD's identifier to the greylist for a period of time. In the latter case, unless the WCD remains within the given distance of the femtocell device, the femtocell may eventually remove the WCD's entry from the greylist.

It should be understood that the given distance may be expressed as a radius from the femtocell device. Also, this radius need not be the range of the femtocell device's wireless coverage area(s). For instance, the radius may be well within such a range of coverage. Furthermore, the radius may be manually provisioned or automatically provisioned in the femtocell device by either the owner of the femtocell device or the wireless service provider. For example, the owner of the femtocell device may manually configure the radius to be within the physical confines over which the owner has control.

Figure 4:
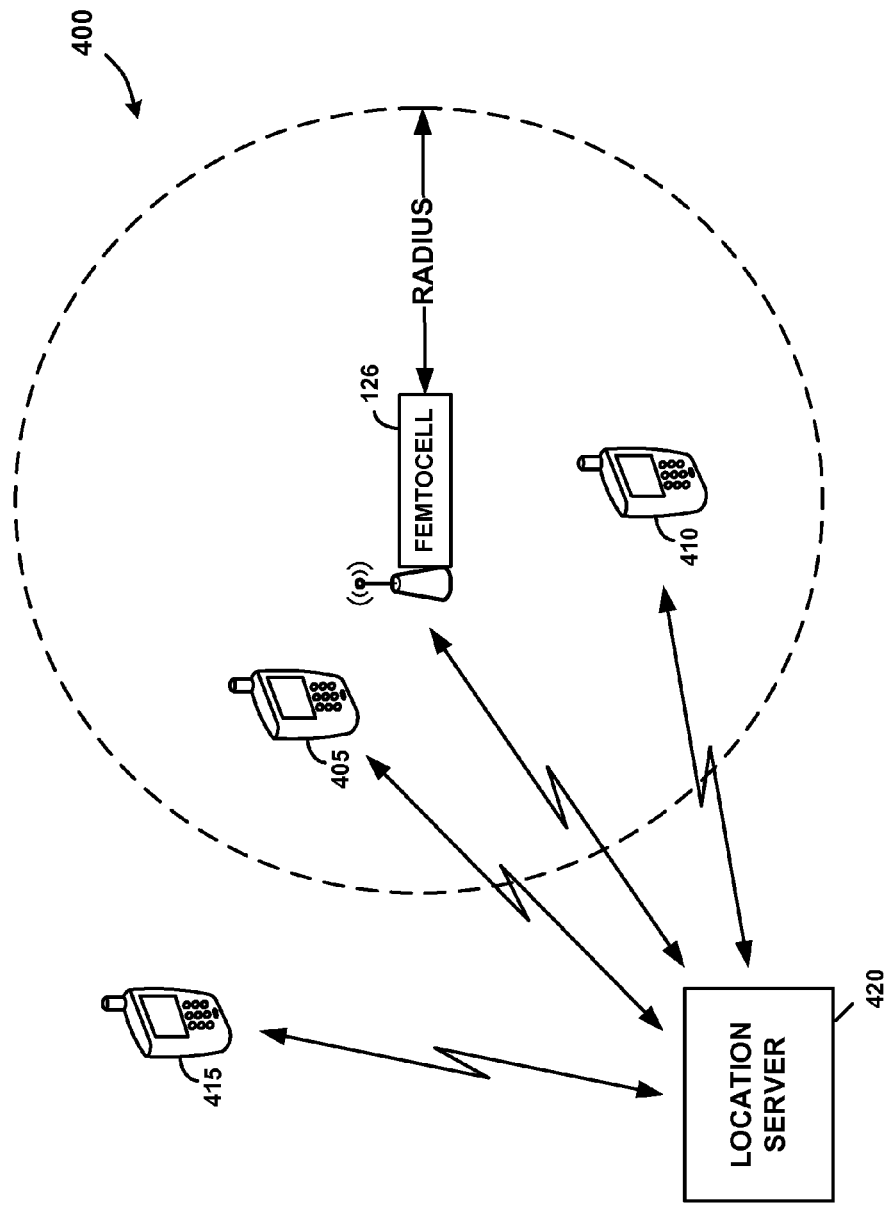
FIG. 4 depicts a femtocell device configured to provide full service to WCDs within a radius of the location of the femtocell device, and further configured to provide a limited service to WCDs outside of the radius, in accordance with an example embodiment.

FIG. 4 shows a depiction 400 of a femtocell device configured with such a radius, and several WCDs. WCD 405 and WCD 410 are located within the radius of femtocell device 126, while WCD 415 is located outside of this radius. Accordingly, femtocell device 126 may grant full service to WCD 405 and 410, regardless of whether the identifiers of these WCDs are in the greylist of femtocell device 126. However, since WCD 415 is outside of the radius, femtocell device 126 may grant WCD 415 a limited service. Of course, if WCD 415 is greylisted, then the femtocell device may grant full service to WCD 415.

Femtocell device 126 may use various means to determine, or at least estimate, whether a WCD is within such a radius. One way in which femtocell device 126 could do so is based on the power with which it receives transmissions from the WCD. For instance, if the transmissions exceed a particular power threshold, femtocell device 126 may determine that the WCD is within the radius. Accordingly, if the transmissions fall short of the particular power threshold, femtocell device 126 may determine that the WCD is not within the radius.

Alternatively, the WCD may report its location directly to femtocell device 126. Most modern WCDs support location determining components, such as global positioning system (GPS) transceivers. Thus, these WCDs may be able to determine their geographical coordinates with a relatively high degree of accuracy. Similarly, femtocell device 126 may also be equipped with such a component. Thus, the WCD could transmit its GPS coordinates to femtocell device 126. Femtocell device 126 could then compare the WCD's GPS coordinates to its own GPS coordinates to determine whether the WCD is within the radius.

As another alternative, the WCD may be arranged to report its coordinates to a location server 420. The WCD may do so automatically from time to time, or upon request of the WCD's user. Location server 420 may reside within the wireless service provider's network (e.g., within macro-cellular RAN 101) or elsewhere. Then, femtocell device 126 may request and receive these coordinates from location server 420.

Nonetheless, the embodiments herein may use other ways to share WCD locations or coordinates with a femtocell device, and may also use other types of coordinates than GPS coordinates.

III. EXAMPLE FEMTOCELL DEVICE PROCEDURES

FIG. 5 is a flow chart 500 of an example procedure that may be employed by a femtocell device. The femtocell device may be communicatively coupled to a network, such as a private IP network or the Internet. The femtocell device may radiate to define at least one wireless coverage area that serves WCDs. Further, the femtocell device may store, or have access to, a first list of WCD identifiers. Preferably, this first list is a greylist.

Moreover, the femtocell device may also store or have access to a data rate threshold value, which specifies a maximum data rate to provide to WCDs whose identifiers are not in the greylist. For instance, if the maximum forward-link data rate achievable by the femtocell device is 3 megabits per second, the data rate threshold might be set to, say, 200 kilobits per second. Such a data rate threshold value would allow non-greylisted WCDs to access and use the femtocell device's wireless services at a reasonable data rate, but is low enough that such use is unlikely to materially impact the performance of greylisted WCDs. The data rate threshold value may be pre-configured to a particular default value, and may be manually overridden by the owner of the femtocell device.

Thus, at step 505 of FIG. 5, a femtocell device may receive a first request for access to the network from a first WCD. The request may contain a first identifier that identifies the first WCD. In response to receiving the first request, at step 510 the femtocell device may determine whether the first identifier is in the greylist. If the first identifier is in the greylist, then at step 515 the femtocell device may grant the first WCD a first data rate at or above a data rate threshold value. However, if the first identifier is not in the greylist, then at step 520 the femtocell device may grant the first WCD a second data rate below the data rate threshold value.

The greylist may be stored in non-volatile memory in the femtocell device, so that when the femtocell device initializes, the greylist is available to the femtocell device. Alternatively, the greylist may be stored in another device, such as a macro-cellular network component. Thus, during initialization, the femtocell device may transmit a message to the macro-cellular network component. This message may identify the femtocell, and seek to obtain the second list. The macro-cellular network component may transmit the greylist to the femtocell device. In response to receiving the greylist, the femtocell device may install the greylist and continue or complete initialization.

As discussed earlier, the femtocell device may grant a WCD full service, even if the WCD's identifier is not in the greylist. This may occur in any number of ways. One of those ways may involve the femtocell device being registered with the femtocell device owner's account. Preferably, this is an account with the wireless service provider, and the account includes service plans for one or more WCDs. For sake of example, assume that the service plan identifies a second WCD as being associated with the account.

Thus, the femtocell device may receive a second request for access to the network from a second WCD. This second request may also contain a second identifier that identifies the second WCD. In response to receiving the second request, the femtocell device may determine that the second identifier is registered with the account. The femtocell device may be arranged to allow the second WCD to have full access to the wireless services of the femtocell device because, by being registered with the account, the second WCD may be on the service plan of the owner of the femtocell device. Therefore, based on the second identifier being registered with the account, the femtocell device may grant the second WCD a second data rate at or above the data rate threshold value.

The femtocell device may add entries to a greylist based on information associated with the owner of the femtocell device. For instance, the owner may subscribe to an instant messaging or social networking service. The femtocell device may have access to an instant messaging or social networking server that stores a list of contact entries for the owner. At least some of the contact entries may include respective WCD identifiers. The femtocell device may receive at least part of this second list from the server. In response to receiving at least part of the second list, the femtocell device may add WCD identifiers from the contact entries of this part of the second list to the first list.

Another way in which the femtocell device may grant a WCD full service is if the WCD is within close proximity of the femtocell device. For example, the femtocell device may contain a location determining component that determines the geographic coordinates of the femtocell device. The femtocell device may also store a radius value indicating how close to the femtocell device a WCD has to be in order for the femtocell device to automatically may grant full service to the WCD.

Thus, the femtocell device may receive a second request for access to the network from a second WCD, the second request containing a second identifier that identifies the second WCD. In response to receiving the second request, the femtocell device may determine the geographic coordinates of the second WCD, and compare the geographic coordinates of the second WCD to the geographic coordinates of the femtocell device. If the distance between the second WCD and the femtocell device is less than the radius value, femtocell device may grant the second WCD a second data rate at or above the data rate threshold value.

The step of the femtocell device determining the geographic coordinates of the second WCD may include the femtocell device transmitting, to a location server, a query for the geographic coordinates of the second WCD. This query may include the second identifier. Then, the femtocell device may receive, from the location server, the geographic coordinates of the second WCD.

It should be understood that the method depicted in flow chart 500 may have more or fewer steps than shown, and that these steps may occur in a different order than presented in flow chart 500 without departing from the scope of the invention. Additionally, each entry of a greylist may include a rule to either allow or deny the associated WCD access to the wireless services of the femtocell device. In the preceding discussion, "adding" a WCD identifier to the greylist was intended to imply that the WCD identifier is added to the greylist with an "allow" rule.

IV. DATA RATE CONTROL

The methods specified in Section III describe how a femtocell device might determine to grant one WCD a higher data rate than the femtocell device has granted another WCD. In this section, ways in which a femtocell device can control a WCD's forward link and reverse link data rates are described. For sake of simplicity and illustration, the following descriptions are written in terms of CDMA wireless technology. However, other wireless technologies could be used similarly.

A CDMA forward link (i.e., from the femtocell device to a WCD) may operate according to time-division multiplexing (TDM), and may be divided into a number of TDM slots. Preferably, the femtocell device transmits a quantity of bits, in the form of one or more symbols, to at least one WCD during each of these TDM slots. This quantity of bits may vary from WCD to WCD and may also vary over time for any given WCD. For example, if a WCD is experiencing good wireless coverage, the femtocell device may be able to transmit more bits per TDM slot. However, if the WCD is experiencing poor wireless coverage, the femtocell device may transmit fewer bits per TDM slot. Thus, the maximum date rate available to the WCD is dependent on the WCD's wireless coverage quality, and the number of TDM slots that the femtocell device allocates to the WCD.

A WCD may, from time to time, measure the quality of its wireless coverage by listening to a forward link channel, such as a pilot channel. The WCD may calculate the channel's signal-to-noise ratio as the received pilot channel energy (denoted Ec) to the total received energy (denoted Io). The result, Ec/Io, is expressed in decibels (dB), and typically falls within the range of 0.0 dB (excellent wireless coverage) to (−16.0 dB) very poor wireless coverage. However, Ec/Io values less than −16.0 are possible. Alternatively, Ec/Io may be referred to as C/I, the carrier-to-interference ratio of the forward link channel. Furthermore, other methods of measuring a forward link channel's signal-to-noise ratio may be used.

Once Ec/Io, or another estimate of wireless coverage quality, is determined, the WCD may transmit this estimate to the femtocell device (for example, in a pilot strength measurement message (PSMM) or a resource utilization message (RUM)), or the WCD may use the estimate to recommend to the femtocell device a forward link data rate that the WCD may be able to receive. Typically, a WCD will attempt to recommend the highest forward link data rate that the WCD estimates that it can receive such that its received frame error rate is reasonably low (e.g., less than 3%). The WCD preferably transmits this information to the femtocell device on a data rate control (DRC) channel as an integer. Example DRC values are shown in Table 1.

TABLE 1

Exemplary DRC values and associated data rates.

| DRC Value | Data rate (kilobits per second) |
| --- | --- |
| 1 | 38.4 |
| 2 | 76.8 |
| 3 | 153.6 |
| 4/5 | 307.2 |
| 6/7 | 614.4 |
| 8 | 921.6 |
| 9/10 | 1228.8 |
| 11 | 1843.2 |
| 12 | 2457.6 |
| 13 | 1536 |
| 14 | 3072 |

The WCD may transmit a DRC value to the femtocell device periodically, according to a static or dynamic schedule, randomly, or in response to a trigger that is internal or external to the WCD. Upon receiving a DRC value from a WCD, the femtocell device may select the data rate associated with the DRC value. Alternatively, the femtocell device may select a higher or lower data rate based on femtocell device configuration or policy. For instance, if the WCD is not greylisted, the femtocell device might select a lower data rate that is commensurate with the data rate threshold value.

During the period in which forward-link TDM slots are allocated to a WCD, the WCD may continue transmitting DRC values to the femtocell device and the femtocell device may responsively adjust the data rate of the forward link. Thus, the femtocell device may have means with which to control the forward link data rate to any given WCD.

Additionally, the femtocell device may also be able to control the reverse link data rate of the WCD. If the reverse link operates according to TDM like the forward link, then the femtocell device may be able to allocate slots on the reverse link so that the WCD's reverse link capacity is limited. However, for some wireless communication technologies, such as certain types of CDMA technologies, each reverse link may be a dedicated link between the WCD and the femtocell device. In such a case, the femtocell device may instruct the WCD to transmit according to a particular parameter or set of parameters. For example, the femtocell device might instruct the WCD to transmit at no more than the data rate threshold value. Alternatively, the femtocell device might provide the WCD with the data rate threshold value, but allow the WCD to exceed this rate from time to time.

For instance, the femtocell device may grant a WCD a "token bucket" specification. Such a specification may include a target data rate. If the WCD transmits at a data rate lower than the target data rate, the WCD may accumulate "credits" than it can use later to exceed the target data rate. However, if the WCD transmits at a data rate higher than the target data rate, it accumulates a "deficit" that it may have to pay back later by transmitting at a data rate lower than the target data rate. When specifying the token bucket, the femtocell device may also include the size of the bucket and the initial level of credits in the bucket.

As an illustrative example, suppose that a femtocell device grants a target data rate of 100 kilobits per second to a WCD, a bucket size of 1000 kilobits per second, and an initial bucket level of 300 kilobits per second. Such a grant may be analogous to the WCD having a "bucket" of credits, where the bucket initially holds 300 credits, holds at most 1000 credits, and is filled at a rate of 100 kilobits each second. For every kilobit the WCD transmits, the bucket is debited one kilobit.

Thus, if the WCD transmits at a data rate of 100 kilobits per second, the bucket remains at steady state. However, if the WCD transmits at a rate greater than 100 kilobits per second, the WCD may eventually empty its bucket, at which point it may have to stop transmitting. Alternatively, the WCD may be arranged to allow negative bucket contents. Negative bucket contents may be analogous to the WCD taking out a loan of credits.

On the other hand, if the WCD transmits at a rate less than 100 kilobits per second, the WCD's bucket may eventually fill to its maximum level, giving the WCD the opportunity to transmit at a data rate greater than 100 kilobits per second at some point in the future.

Alternatively, some wireless communication technologies may regulate data rates on a reverse link by using a mechanism similar to a token bucket for a WCD's transmission power. Generally speaking, the greater the power at which a WCD transmits, the greater the data rate that the transmission is capable of supporting. For instance, CDMA EVDO Rev. A technologies may use a token-bucket-like mechanism to regulate the traffic-to-pilot (T2P) ratio of a WCD's reverse link transmissions. In CDMA EVDO Rev. A, a WCD may transmit a message to its serving femtocell device to request a given T2P ratio. In response, the femtocell device may transmit one or more T2P parameters to the WCD. These parameters may include a T2PInflow (bucket replenishment rate) and a Bucketlevel (initial bucket level) specification. Additionally, the RAN may also transmit a T2PHold specification, indicating how long the WCD should wait before requesting a different T2P ratio. The femtocell device may also transmit T2P parameters to a WCD asynchronously of any T2P requests from the WCD.

Given that a femtocell device may be able to control the forward link and reverse link data rates of a WCD, the femtocell device do so to enforce a data rate threshold value on a non-greylisted WCD. For instance, the femtocell device might limit the forward data rate, the reverse data rate, or both, of a given WCD.

Furthermore, the femtocell device may support separate forward link and reverse link data rate threshold values. Thus, the femtocell device may apply the forward link data rate threshold value to the WCD's forward link while applying the reverse link data rate threshold value to the WCD's reverse link.

Accordingly, the femtocell device may manipulate a DRC value for a WCD so that a maximum forward link data rate of the WCD conforms approximately to a data rate threshold value. For instance, suppose that the forward link data rate threshold value is 100 kilobits per second. If the WCD transmits a DRC value of 3 or higher, the femtocell device might manipulate this DRC value so that the effective data rate is one which would normally be associated with a lower DRC value. If the femtocell device cannot directly allocate exactly 100 kilobits per second to the WCD, the femtocell device may allocate approximately 100 kilobits per second to the WCD by varying the effective DRC value it uses over time. For example, to achieve a data rate of approximate 100 kilobits per second, the femtocell device may fluctuate between transmitting at 76.8 kilobits per second (i.e., a DRC value of 2) and 153.6 kilobits per second (i.e., a DRC value of 3) over time to achieve about 100 kilobits per second.

Similarly, on the reverse link, the femtocell device may manipulate a T2P ratio of a WCD's reverse link transmissions so that a maximum reverse link data rate of the WCD conforms approximately to the a particular data rate. For a CDMA-like reverse link technology that regulates a WCD's reverse link data rate with a token bucket, the femtocell device may manipulate the token bucket's inflow rate to be commensurate with the particular data rate.

Regardless of how the femtocell device polices data rates of WCDs, the femtocell device might adjust these data rates based on load. For instance, if usage of the femtocell device's processing capacity, wireless capacity, or backhaul (e.g., the broadband link connecting the femtocell device to a network) capacity exceeds a traffic load threshold value, the femtocell device may responsively lower the data rate threshold value of non-greylisted WCDs. In this way, the femtocell device increases the amount capacity available to greylisted WCDs. Thus, in an example embodiment, the femtocell device may determine that a traffic load at the femtocell device is above a first traffic load threshold value. In response to determining that the traffic load is above the first traffic load threshold value, the femtocell device may lower the data rate threshold value.

On the other hand, if usage of the femtocell device's processing capacity, wireless capacity, or backhaul capacity is below the threshold, the femtocell device may grant higher data rates to non-greylisted WCDs. In this way, the femtocell device allows non-greylisted WCDs to use any spare capacity of the femtocell device. Therefore, in another example embodiment, the femtocell device may determine that the traffic load is below the traffic load threshold value. In response to determining that the traffic load is above the traffic load threshold value, the femtocell device may raise the data rate threshold value.

In another set of embodiments, the data rate threshold value may be based on the capacity of the connection or series of connections between the femtocell device and other network components. Turning once again to FIG. 1, a femtocell device, such as femtocell device 126, may be deployed in a location that is connected to the Internet 124 via a broadband link, such as broadband connection 127. Accordingly, it may be advantageous for femtocell device 126 to attempt to limit the data rates of non-greylisted WCDs to be no more than a certain percentage of the capacity of broadband connection 127, so that at least some of the capacity is available for greylisted WCDs.

To achieve this goal, femtocell device 126 may contain program instructions arranged to measure the uplink capacity of broadband connection 127. This measurement can occur in a number of ways, including but not limited to femtocell device 126 transmitting one or more streams of packets to a network component, such as BR 122 or VPN terminator 128. Femtocell device 126 may transmit these streams at increasing data rates. The network component may respond to packets in these streams with some form of positive or negative acknowledgements so that femtocell device 126 is aware of the approximate throughput of these streams.

As the data rate of these streams increases, the throughput of the streams is likely to increase proportionally. However, as the data rate approaches the uplink capacity of broadband connection 127, the throughput may stop increasing, due to broadband connection 127 being over capacity and packets being dropped. At this point, the measurements of uplink capacity may end. Femtocell device 126 may then approximate the uplink capacity of broadband connection 127 as the highest achieved throughput over the duration of the measurements.

Femtocell device 126 may also contain program instructions arranged to measure the downlink capacity of broadband connection 127. This measurement may occur by femtocell device 126 receiving one or more streams of packets of an increasing data rate from the network component. Similarly to how the uplink capacity is approximated, the downlink capacity may also be approximated based on the maximum through achievable from the network component to femtocell device 126.

Once these measurements are complete, the respective results may be used by the femtocell device to determine the data rate threshold value. The femtocell device may use one data rate threshold value that is based on both the uplink and downlink capacities of the broadband connection. For example, if the femtocell device determines that the uplink capacity is 1 megabit per second and that the downlink capacity is 2 megabits per second, the femtocell device may set the data rate threshold value to a certain percentage of one or the other of the uplink capacity and the downlink capacity. Thus, if the percentage of 20%, the femtocell device may set the data rate threshold value to either 200 kilobits per second or 400 kilobits per second. Alternatively, the femtocell device may use separate data rate threshold values for forward link and reverse link traffic, where the reverse link data rate threshold value is based on the uplink capacity and the forward link data rate threshold is based on the downlink capacity.

Regardless of how the data rate threshold value is determined and whether one or more data rate threshold values are used, the femtocell device may use a data rate threshold value to limit the data rates of one or more non-greylisted WCDs. Thus, the femtocell device may limit the data rate of each non-greylisted WCD to less than the data rate threshold value. Alternatively, the femtocell device may limit the aggregate data rate of all non-greylisted WCDs to less than the data rate threshold value.

V. CONCLUSION

Exemplary embodiments have been described above. Those skilled in the art will understand, however, that changes and modifications may be made to these embodiments without departing from the true scope and spirit of the invention, which is defined by the claims.

What is claimed is:

1. A method, performed by a femtocell device, wherein the femtocell device is communicatively coupled to a network, wherein the femtocell device is communicatively coupled to a macro-cellular network component via the network, wherein the femtocell device radiates to define a wireless coverage area that serves wireless communication devices (WCDs), and wherein the femtocell device stores a first list of WCD identifiers, the method comprising:

the femtocell device receiving a second list of WCD identifiers from the macro-cellular network component;

in response to receiving the second list, the femtocell device adding, to the first list, at least some of the WCD identifiers in the second list;

the femtocell device receiving a first request for access to the network from a first WCD, the first request containing a first identifier that identifies the first WCD;

in response to receiving the first request, the femtocell device determining that the first identifier is in the first list;

based on the first identifier being in the first list, the femtocell device granting the first WCD a first data rate at or above a data rate threshold value;

the femtocell device receiving a second request for access to the network from a second WCD, the second request containing a second identifier that identifies the second WCD;

in response to receiving the second request, the femtocell device determining that the second identifier is not in the first list; and based on the second identifier not being in the first list, the femtocell device granting the second WCD a second data rate below the data rate threshold value.

2. The method of claim 1, wherein the femtocell device granting the second WCD the second data rate further comprises:

the femtocell device manipulating a data rate control (DRC) value for the second WCD so that a maximum forward link data rate of the second WCD conforms approximately to the second data rate.

3. The method of claim 1, wherein the femtocell device granting the second WCD the second data rate further comprises:

the femtocell device manipulating a traffic-to-pilot (T2P) ratio of a WCD's reverse link transmissions so that a maximum reverse link data rate of the second WCD conforms approximately to the second data rate.

4. The method of claim 1, further comprising:

before the femtocell device receives the second list, the femtocell device transmitting a message to the macro-cellular network component, wherein the message (i) identifies the femtocell, and (ii) seeks to obtain the second list.

5. The method of claim 1, wherein the femtocell device is registered with an account, the method further comprising:
the femtocell device receiving a third request for access to the network from a third WCD, the third request containing a third identifier that identifies the third WCD;
in response to receiving the third request, the femtocell device determining that the third identifier is also registered with the account; and
based on the third identifier being registered with the account, the femtocell device granting the third WCD a third data rate at or above the data rate threshold value.

6. The method of claim 1, wherein the femtocell device has access to a server that stores a third list of contact entries, and wherein at least some of the contact entries in the third list include respective WCD identifiers, the method further comprising:
the femtocell device receiving at least part of the third list from the server; and
in response to receiving at least part of the third list, the femtocell device adding, to the first list, one or more WCD identifiers from the contact entries in the at least part of the third list.

7. The method of claim 1, wherein the femtocell device contains a location determining component that determines geographic coordinates of the femtocell device, and wherein the femtocell device stores a radius value, the method further comprising:
the femtocell device receiving a second request for access to the network from a second WCD, the second request containing a second identifier that identifies the second WCD;
in response to receiving the second request, the femtocell device (i) determining geographic coordinates of the second WCD, and (ii) comparing the geographic coordinates of the second WCD to the geographic coordinates of the femtocell device to determine that a distance between the second WCD and the femtocell device is less than the radius value; and
based on the second WCD being located within the radius value of the femtocell device, the femtocell device granting the second WCD a second data rate at or above the data rate threshold value.

8. The method of claim 7, determining the geographic coordinates of the second WCD comprises:
the femtocell device transmitting, to a location server, a query for the geographic coordinates of the second WCD, wherein the query includes the second identifier; and
the femtocell device receiving, from the location server, the geographic coordinates of the second WCD.

9. The method of claim 1, further comprising:
the femtocell device determining that a traffic load at the femtocell device is above a first traffic load threshold value; and
in response to determining that the traffic load is above the first traffic load threshold value, the femtocell device lowering the data rate threshold value.

10. The method of claim 1, wherein a broadband connection communicatively couples the femtocell device to the network, and wherein the second data rate is based on a capacity of the broadband connection.

11. A method, performed by a femtocell device, wherein the femtocell device is communicatively coupled to a network, wherein the femtocell device is communicatively coupled to a macro-cellular network component via the network, wherein the femtocell device radiates to define a wireless coverage area that serves wireless communication devices (WCDs), and wherein the femtocell device stores a first list of WCD identifiers, the method comprising:
the femtocell device receiving a second list of WCD identifiers from the macro-cellular network component;
in response to receiving the second list, the femtocell device adding, to the first list, at least some of the WCD identifiers in the second list;
the femtocell device receiving a first request for access to the network from a first WCD, the request containing a first identifier that identifies the first WCD;
in response to receiving the first request, the femtocell device determining whether the first identifier is in the first list;
if the first identifier is in the first list, the femtocell device granting the first WCD a first data rate at or above a data rate threshold value; and
if the first identifier is not in the first list, the femtocell device granting the first WCD a second data rate below the data rate threshold value.

12. The method of claim 11, wherein the femtocell device is registered with an account, the method further comprising:
the femtocell device receiving a second request for access to the network from a second WCD, the second request containing a second identifier that identifies the second WCD;
in response to receiving the second request, the femtocell device determining that the second identifier is registered with the account; and
based on the second identifier being registered with the account, the femtocell device granting the second WCD a second data rate at or above the data rate threshold value.

13. The method of claim 11, wherein the femtocell device has access to a server that stores a third list of contact entries, and wherein at least some of the contact entries in the third list include respective WCD identifiers, the method further comprising:
the femtocell device receiving at least part of the third list from the server; and
in response to receiving at least part of the third list, the femtocell device adding, to the first list, one or more WCD identifiers from the contact entries in the at least part of the third list.

14. The method of claim 11, wherein the femtocell device contains a location determining component that determines geographic coordinates of the femtocell device, and wherein the femtocell device stores a radius value, the method further comprising:
the femtocell device receiving a second request for access to the network from a second WCD, the second request containing a second identifier that identifies the second WCD;
in response to receiving the second request, the femtocell device (i) determining geographic coordinates of the second WCD, and (ii) comparing the geographic coordinates of the second WCD to the geographic coordinates of the femtocell device to determine that a distance between the second WCD and the femtocell device is less than the radius value; and
based on the second WCD being located within the radius value of the femtocell device, the femtocell device granting the second WCD a second data rate at or above the data rate threshold value.

15. A femtocell device, communicatively coupled to a network and to a macro-cellular network component via the network, comprising:
- a transceiver that radiates to define a wireless coverage area that serves wireless communication devices (WCDs);
- a processor;
- a data storage that stores a first list of WCD identifiers; and
- program instructions, stored in the data storage and executable by the processor, to (i) receive a second list of WCD identifiers from the macro-cellular network component, (ii) in response to receiving the second list, add, to the first list, at least some of the WCD identifiers in the second list, (iii) receive a first request for access to the network from a first WCD, the first request containing a first identifier that identifies the first WCD, (iv) in response to receiving the first request, determine that the first identifier is in the first list, (v) based on the first identifier being in the first list, grant the first WCD a first data rate at or above a data rate threshold value, (vi) receive a second request for access to the network from a second WCD, the second request containing a second identifier that identifies the second WCD, (vii) in response to receiving the second request, determine that the second identifier is not in the first list, and (viii) based on the second identifier not being in the first list, grant the second WCD a second data rate below the data rate threshold value.

16. The femtocell device of claim 15, wherein the femtocell device is registered with an account, the femtocell device further comprising:
- program instructions, stored in the data storage and executable by the processor, to (i) receive a third request for access to the network from a third WCD, the third request containing a third identifier that identifies the third WCD, (ii) in response to receiving the third request, determine that the third identifier is also registered with the account, and (iii) based on the third identifier being registered with the account, grant the third WCD a third data rate at or above the data rate threshold value.

17. The femtocell device of claim 15, wherein the femtocell device has access to a server that stores a third list of contact entries, and wherein at least some of the contact entries in the third list include respective WCD identifiers, the femtocell device further comprising:
- program instructions, stored in the data storage and executable by the processor, to (i) receive at least part of the third list from the server, and (ii) in response to receiving at least part of the third list, add, to the first list, one or more WCD identifiers from the contact entries of the at least part of the third list.

18. The femtocell device of claim 15, wherein the femtocell device stores a radius value, the femtocell device further comprising:
- a location determining component that determines geographic coordinates of the femtocell device; and
- program instructions, stored in the data storage and executable by the processor, to (i) receive a third request for access to the network from a third WCD, the third request containing a third identifier that identifies the third WCD, and (ii) in response to receiving the third request, (a) determine geographic coordinates of the third WCD, and (b) compare the geographic coordinates of the third WCD to the geographic coordinates of the femtocell device to determine that a distance between the third WCD and the femtocell device is less than the radius value, and (iii) based on the third WCD being located within the radius value of the femtocell device, grant the third WCD a third data rate at or above the data rate threshold value.

19. The femtocell device of claim 15, further comprising:
- program instructions, stored in the data storage and executable by the processor, to (i) determine that a traffic load at the femtocell device is above a traffic load threshold value, and (ii) in response to determining that the traffic load is above the traffic load threshold value, lower the data rate threshold value.

* * * * *